United States Patent [19]

Chauvel

[11] 4,386,131

[45] May 31, 1983

[54] NON-WOVEN FABRICS AND IN PARTICULAR CLOTHS FOR HYGIENE USE

[75] Inventor: Bernard Chauvel, Ermont, France

[73] Assignee: Rhone-Poulenc Industries, Paris, France

[21] Appl. No.: 320,300

[22] Filed: Nov. 12, 1981

[30] Foreign Application Priority Data

Nov. 19, 1980 [FR] France ............................... 80 24517

[51] Int. Cl.³ .............................................. D04H 1/58
[52] U.S. Cl. ..................................... 428/288; 428/299
[58] Field of Search ............................... 428/288, 290

[56] References Cited

U.S. PATENT DOCUMENTS 3,255,276  6/1966  Winter ................................. 260/897
3,985,831 10/1976  Boyer ............................... 260/880 R

*Primary Examiner*—Marion McCamish
*Attorney, Agent, or Firm*—McDougall, Hersh & Scott

[57] ABSTRACT

Non-woven fabrics and in particular cloths for hygiene use, comprising a layer of fibers which are fixed by at least one binder. The binder is an interpolymer comprising a copolymer A of butadiene, styrene and at least one ethylenic unsaturated carboxylic acid and a polymer B of bis(2-chloroethyl)vinylphosphonate which is at least partly grafted onto copolymer A, having enhanced suitability for heat sealing and increased hydrophilia.

10 Claims, No Drawings

NON-WOVEN FABRICS AND IN PARTICULAR CLOTHS FOR HYGIENE USE

The present invention concerns non-woven fabrics and in particular cloths for hygiene use. It also concerns a process for producing such fabrics.

Disposable hygiene non-woven fabrics such as baby cot covers, sanitary towels, dressings, etc., comprise a layer of fibers which are fixed by at least one binder. Materials that have already been proposed as binders for this use include synthetic polymers such as copolymers of butadiene and styrene, carboxylated copolymers of butadiene and styrene, copolymers of vinyl chloride and alkyl acrylate, carboxylated copolymers of vinyl chloride and alkylacrylate copolymers of vinyl chloride and vinylidene chloride, carboxylated copolymers of vinyl chloride and vinylidene chloride, polyalkyl acrylates and carboxylated polyalkyl acrylates.

The non-woven fabrics are produced from layers of fibers which are prepared by dry processes and wet processes, and which are subjected to a binding operation. In most cases, the binding operation only involves partial binding on one of the surfaces of the layer of fibers, this being effected in accordance with a conventional coating process or in accordance with one of the other known methods (binding by precipitation in the body of the article, spraying, saturation, etc.)

In most cases, the bath used in the binding operation contains the synthetic polymer in latex form as the binder, a thickening agent for adjusting the viscosity of the bath and therefore the weight of the deposit, optionally a surface active agent and optionally an anti-foam agent. After binding, the layer of fibers is dried in a furnace. The thickening agents used are generally carboxymethylcelluloses or derivatives thereof, poly(sodium acrylates), poly(sodium methacrylates) or aqueous emulsions of polyacrylic acids.

The qualities required of non-woven fabrics include tearing strength, in particular in a wet condition, suitability for heat sealing at a high rate, hydrophilia or water absorbency, and a low blocking level.

The non-woven fabrics, according to the invention, comprise a layer of fibers which are fixed by at least one binder, said binder being an interpolymer comprising a copolymer A of butadiene, styrene and at least one ethylenic unsaturated carboxylic acid and a polymer B of bis(2-chloroethyl)vinylphosphonate which is at least partly grafted on to the copolymer A.

The applicants have in fact found that, when used as the binder, the above-mentioned interpolymer results in a non-woven fabric which has enhanced suitability for heat sealing at a high rate and a higher level of hydrophilia than the corresponding copolymer A.

Preferably, the interpolymer comprises from 80 to 99% by weight of copolymer A and from 20 to 1% by weight of polymer B.

Also preferably, the copolymer A comprises, by weight, from 25 to 55% of butadiene, from 35 to 74% of styrene and from 1 to 10% of at least one ethylenic unsaturated carboxylic acid.

Also preferably, the polymer B comprises, by weight, from 15 to 100% of bis(2-chloroethyl)vinylphosphonate and from 0 to 85% of at least one ethylenic unsaturated compound copolymerizable with bis(2-chloroethyl)-vinylphosphonate.

Also preferably, the part of the interpolymer which is insoluble in isopropyl alcohol represents at least 75% of the interpolymer and comprises, in the grafted condition, from 0.2 to 15% by weight of bis(2-chloroethyl)-vinylphosphonate.

Examples of ethylenic unsaturated carboxylic acids involved in the composition of copolymer A include in particular acrylic acid, methacrylic acid, itaconic acid, maleic acid and fumaric acid.

Examples of compounds which are copolymerizable with bis(2-chloroethyl)vinylphosphonate include in particular vinylaromatic compounds, vinylhalides, vinylidene halides, dienic compounds, vinyl esters of carboxylic acid and acrylic compounds. The following may be more particularly mentioned: styrene, α-methylstyrene, paratertiobutylstyrene, chlorostyrene, vinyltoluene, vinylchloride, vinylbromide, vinylfluoride, vinylidenechloride, butadiene, isoprene, chloroprene, acrylic acid, methacrylic acid, acrylamide, methacrylamide, acrylic nitrile, methacrylic nitrile, chloroacrylonitrile, vinyl acetate, esters of acrylic acids such as methylacrylate ethylacrylate, hydroxyethylacrylate, hydroxypropylacrylate, n-butylacrylate and isobutylacrylate, and esters of methacrylic acid such as methylmethacrylate, ethylmethacrylate, hydroxyethylmethacrylate, hydroxypropylmethacrylate, n-butylmethacrylate and isobutylmethacrylate.

In accordance with the process of the invention, a layer of fibers is brought into contact with a polymer latex-base binding bath, the layer of fibers is compressed to ensure that the polymer penetrates into the layer, and then the layer is dried, said polymer being an interpolymer comprising a copolymer A of butadiene, styrene and at least one ethylenic unsaturated carboxylic acid and a polymer B of bis(2-chloroethyl)vinylphosphonate which is at least partly grafted on to the copolymer A. The above-mentioned latex is an aqueous dispersion of particles of the interpolymer, of a diameter which is essentially between 0.1 and 1 $\mu$m.

The content by weight of dry materials in the interpolymer latex is generally from 1 to 70% and preferably from 30 to 55%.

One way of preparing a latex of the interpolymer comprises preparing a latex of copolymer A by emulsion polymerization of butadiene, styrene and at least one ethylenic unsaturated carboxylic acid, followed by polymerization in the presence of the copolymer A latex of bis(2-chloroethyl)vinylphosphonate and optionally at least one ethylenic unsaturated compound copolymerizable with bis(2-chloroethyl)vinylphosphonate.

The latex of copolymer A is prepared in per se known manner by aqueous emulsion polymerization of butadiene, styrene and at least one ethylenic unsaturated carboxylic acid, in the presence of at least one initiating agent and at least one emulsifying agent, with a level of concentration of the mixture of monomers in the reaction medium generally being between 20 and 60% by weight.

The butadiene generally represents from 15 to 85% and preferably from 25 to 55% by weight of the total of monomers to be polymerized.

The styrene generally represents from 5 to 84% and preferably from 35 to 74% by weight of the total of monomers to be polymerized.

The amount of carboxylic acid used is generally from 1 to 10% by weight with respect to the total of monomers to be polymerized.

The monomers used can be introduced into the reaction medium in the form of a mixture or separately and simultaneously as a single batch, before polymerization begins, in successive fractions or continuously during the course of the polymerization.

The emulsifying agent used is conventional anionic agents represented in particular by fatty acid salts, alkylsulphates, alkylsulphonates, arylsulphates, arylsulphonates, alkylarylsulphates, alkylarylsulphonates, sulphosuccinates, alkali metal alkylphosphates, and hydrogenated or unhydrogenated abietic acid salts. They are used in an amount of from 0.01 to 5% by weight with respect to the total of monomers.

The initiating agent, which is water-soluble, is represented more particularly by hydroperoxides, such as hydrogen peroxide, cumene hydroperoxide, diisopropylbenzene hydroperoxide, and paramenthane hydroperoxide, and by persulphates such as sodium persulphate, potassium persulphate and ammonium persulphate. It is used in amounts of from 0.5 to 2% by weight with respect to the total of monomers. The initiating agents are possibly associated with a reducing agent such as sodium formaldehydesulphoxylate or bisulphite, polyethyleneamines, the sugars; dextrose and sucrose, and metal salts. The amounts of reducing agent used vary from 0 to 3% by weight with respect to the total of monomers.

The reaction temperature which depends on initiating agent used is generally from 0° to 110° C. and preferably from 25° to 90° C.

Polymerization of bis(2-chloroethyl)vinylphosphonate and optionally a compound which is copolymerizable with bis(2-chloroethyl)vinylphosphonate, in the presence of copolymer A, is performed in aqueous emulsion, with or without an emulsifying agent, in the presence of a polymerization initiating agent and optionally a transfer agent with a level of concentration of the total copolymer A+monomer(s) in the reaction medium of from 20 to 70% by weight.

The amount of latex of copolymer A used is such that the copolymer A generally represents from 80 to 99% by weight of the total of copolymer A+monomer(s).

The initiator which is identical to or different from that used for preparing copolymer A is selected from the above-mentioned initiating agents. It is used in amounts of from 0.05 to 6% by weight with respect to the monomer(s).

The emulsifying agent present in the latex of copolymer A is generally sufficient to maintain stability of the emulsion during the polymerization step. However, in some cases, it may be useful to add an additional amount of emulsifying agent, which is the same as or different from that used for preparing the copolymer A. The emulsifying agent is selected from the list set forth above. It is introduced in a proportion of from 0 to 2.5% by weight with respect to the total of copolymer A+monomer(s).

The transfer agent, which is used in proportions ranging from 0 to 3% by weight with respect to the monomer or monomers, is generally selected from mercaptans such as N-dodecylmercaptan and tertiododecylmercaptan; cyclohexene; and halogenated hydrocarbons such as chloroform, bromoform and carbon tetrachloride. It makes it possible for the proportion of polymer grafted and the length of the grafted molecular chains to be adjusted. It is added to the reaction medium either before polymerization or in the course of polymerization.

The reaction temperature, which depends on the monomer which is copolymerizable with bis(2-chloroethyl)vinylphosphonate and the initiating agent used, is generally from 0° to 110° C. and preferably from 25° to 90° C.

The following example, in which the parts are specified by weight, is intended to illustrate the invention.

EXAMPLE 1

Preparation of copolymer A

The following, are introduced into a stainless steel autoclave provided with an agitator:
43 parts of butadiene,
53 parts of styrene,
100 parts of deionized water,
2 parts of acrylic acid,
2 parts of itaconic acid,
0.5 part of sodium laurylsulphate, and
0.8 part of ammoniumpersulphate.

The reaction mixture is heated at 75° C. and maintained at that temperature throughout the reaction. After 10 hours of reaction, the conversion rate is of the order of 98%. The unreacted butadiene is degassed. The particles of the latex produced are about 0.15 μm in diameter and are of a composition which is substantially equivalent to that of the products used.

Polymerization in the presence of copolymer A

The following, are introduced into a stainless steel autoclave provided with an agitator:
88 parts of copolymer A in the form of the latex prepared in Example 1,
5.4 parts of bis(2-chloroethyl)vinylphosphonate,
6.6 parts of methylmethacrylate, and
1 part of sodium hydroxide.

The temperature of the reaction medium is raised to 75° C. and 0.48 part of ammonium persulphate dissolved in 10 parts of deionized water is introduced into the autoclave. The above-indicated temperature is maintained for 4 hours, and the temperature is then raised to 85° C. and maintained for 3 hours, followed by cooling to ambient temperature. The resulting product is an interpolymer latex which can be used in accordance with the invention and the characteristics of which are set out in Table 1.

TABLE 1

| Content by weight of dry materials in the interpolymer latex (%) | Proportion of interpolymer insoluble in isopropyl alcohol (%) | Content by weight of bis(2-chloroethyl)vinylphosphonate present in the grafted state in the part of the interpolymer insoluble in isopropyl alcohol (%) |
| --- | --- | --- |
| 49.6 | 85.4 | 4.5 |

The proportion of interpolymer which is insoluble in isopropyl alcohol is determined by means of the following method:

Taking the latex to be examined, a film which is 15/100 mm in thickness (as measured in the wet state) is prepared on a glass plate. The film is dried for 2 hours at ambient temperature and then for 2 hours in a drying oven at 50° C. A sample of interpolymer whose weight Po is close to 200 mg is taken from the film, and placed in a small bag produced from a filter paper. The bag containing the interpolymer is suspended for 7 hours in isopropyl alcohol which is heated under reflux. After draining of the bag and drying it on dry filter paper, and removing the isopropyl alcohol by the sample of interpolymer being left in the drying oven at a temperature of 110° C. for 15 hours, the weight P of the sample is determined. The proportion of interpolymer insoluble in isopropyl alcohol is given by the ratio P/Po expressed as a percentage.

The proportion by weight of bis(2-chloroethyl)vinylphosphonate, which is present in the grafted state, in the part of the interpolymer which is insoluble in isopropyl alcohol, is determined by quantitative analysis, using elementary analysis methods, of the phosphorus contained in said part of the interpolymer.

Production of the non-woven fabric

Partial binding is carried out on the face of a layer of carded fibers comprising viscose of 1.5 d Tex and 40 mm in length (1 Tex=weight in mg of 1 meter of fiber). The binder is deposited on the layer of fibers by means of a roller which is partially immersed in the binding bath, and then the impregnated layer is compressed between two cylinders which ensure that the binder penetrates into the layer. The layer is then dried in a tunnel furnace at a temperature of 150° C. for a period of 2 minutes.

The resulting non-woven fabric is examined from the point of view of tearing strength, suitability for heat sealing, hydrophilia and blocking level, by means of the following methods:

Tearing Strength

Tearing strength is determined by means of a dynamometer which is known industrially by the title "Lhomargy". The conditions of the measuring operation are as follows:
dimensions of the testpieces: 5×20 cm
conditioning of the testpieces for at least 24 hours at a temperature of 20° C. in an atmosphere containing 65% relative humidity,
traction speed: 10 cm/min
initial distance between jaws: 15 cm.

Measurements are taken in the longitudinal and in the transverse directions, and are made in a dry condition. They are also made in a wet condition, that is to say, immediately after immersion in water at 20° C.

Suitability for heat sealing

This is determined by means of the "Lhomargy" dynamometer by measuring the resistance of two welded testpieces of non-woven fabric, to being torn apart, the weld having been produced between movable jaws which are raised to a temperature of 150° C. and which operate at a rate of 100 strikes per minute. The conditions of the measuring operation are as follows:
dimensions of the testpieces: 5×20 mm
the testpieces are set at a temperature of 20° C. in an atmosphere of 65% relative humidity, and
traction speed: 10 cm/min.

The measurements are made on two testpieces which are welded by way of their coated face and on two testpieces which are welded by way of their non-coated face.

Hydrophilia

Hydrophilia is determined by measuring the time for wetting of a sample of non-woven fabric measuring 101×10 mm, which is conditioned for 24 hours at a temperature of 20° C. in an atmosphere containing 65% relative humidity. The sample is first folded in two and then in two again, so as to produce a square with a side of 5 cm. Placed at each corner of the resulting square, is an aluminum paper clip weighing approximately 0.07 g, and then the sample is subjected to a pressure of about 100 kPa. The sample is then gently placed on the surface of a bath of distilled water. The wetting time is the time elapsed when the entire surface of the sample is wetted.

Blocking level

This is determined by means of the "Lhomargy" dynamometer by measuring the force required to separate two samples of non-woven fabric which are applied one on top of the other, with the coated face facing the non-coated face, under a pressure of 400 MPa for 15 minutes at ambient temperature. The conditions of the measuring operation are as follows:
dimension of the testpieces: 5×20 cm
conditioning of the testpieces for 1 hour at a temperature of 20° C. in an atmosphere containing 65% relative humidity, and
traction speed 10 cm/min.

For producing the binding baths, the latex of the interpolymer and the latex of copolymer A, which is studied by way of comparison, are diluted with water down to a dry material content of 40% by weight, and then poly(sodium methacrylate) is added until the viscosity thereof is about 1.2 Pa.s.

Table 2 sets out the results obtained, also showing the weight of the non-woven fabric and the weight of the binder deposited.

TABLE 2

|  | Comparative test | Example 1 |
| --- | --- | --- |
| Weight of the non-woven fabric (g/m2) | 19.9 ± 0.3 | 19.5 ± 0.3 |
| Weight of the deposited binder (g/m2) | 5.0 | 4.5 |
| Tearing strength (cN/5 cm) longitudinal direction |  |  |
| dry | 3300 ± 200 | 3500 ± 100 |
| wet | 1750 ± 100 | 1750 ± 100 |
| transverse direction |  |  |
| dry | 570 ± 20 | 570 ± 20 |
| wet | 280 ± 20 | 280 ± 20 |
| Suitability for heat sealing (cN/5 cm) |  |  |
| coated faces | 175 ± 25 | 225 ± 35 |
| non-coated faces | 200 ± 25 | 310 ± 25 |
| Hydrophilia (seconds) | 294 | 25 |
| Blocking level (cN/5 cm) | 215 | 215 |

It will be seen that the non-woven fabric comprising a layer of fibres which are fixed by the interpolymer has enhanced suitability for heat sealing and a higher degree of hydrophilia than that comprising the same layer of fibres fixed by the corresponding copolymer A.

I claim:

1. Non-woven fabrics comprising a layer of fibers and a binder fixing the fibers in the fabric comprising an interpolymer of a copolymer A of butadiene, styrene and at least one ethylenic unsaturated carboxylic acid and a polymer B of bis(2-chloroethyl)vinylphosphonate which is at least partly grafted on to the copolymer A.

2. Non-woven fabrics as claimed in claim 1, in which the interpolymer comprises from 80 to 99% by weight of copolymer A and from 20 to 1% by weight of polymer B.

3. Non-woven fabrics as claimed in claim 1, in which copolymer A comprises by weight from 25 to 55% of butadiene, from 35 to 74% of styrene and from 1 to 10% of at least one ethylenic unsaturated carboxylic acid.

4. Non-woven fabrics as claimed in claim 3, in which the carboxylic acid is selected from the group consisting of acrylic acid, methacrylic acid, itaconic acid, maleic acid and fumaric acid.

5. Non-woven fabrics as claimed in claim 1, in which polymer B comprises by weight from 15 to 100% of bis(2-chloroethyl)vinylphosphonate and from 0 to 85% of at least one ethylenic unsaturated compound copolymerizable with bis(2-chloroethyl)vinylphosphonate.

6. Non-woven fabrics as claimed in claim 5, in which the compound copolymerizable with bis(2-chloroethyl)vinylphosphonate is selected from the group consisting of vinylaromatic compounds, vinylhalides, vinylidenehalides, dienic compounds, vinylic esters of carboxylic acid and acrylic compounds.

7. Non-woven fabrics as claimed in claim 5, in which the compound copolymerizable with bis(2-chloroethyl)vinylphosphonate is selected from the group consisting of styrene, α-methylstyrene, paratertiobutylstyrene, chlorostyrene, vinyltoluene, vinylchloride, vinylbromide, vinylfluoride, vinylidenechloride, butadiene, isoprene, chloroprene, acrylic acid, methacrylic acid, acrylamide, methacrylamide, acrylic nitrile, methacrylic nitrile, chloroacrylonitrile, vinyl acetate, esters of acrylic acid and esters of methacrylic acid.

8. Non-woven fabrics as claimed in claim 5, in which the compound copolymerizable with bis(2-chloroethyl)vinylphosphonate is selected from the group consisting of methylacrylate, ethylacrylate, hydroxyethylacrylate, hydroxypropyl acrylate, n-butylacrylate, isobutylacrylate, methylmethacrylate, ethylmethacrylate, hydroxyethylmethacrylate, hydroxypropylmethacrylate, n-butylmethacrylate and isobutylmethacrylate.

9. Non-woven fabrics as claimed in caim 1, in which the interpolymer is partially insoluble in isopropyl alcohol, in which the insoluble portion represents at least 75% of the interpolymer and contains in the grafted state, from 0.2 to 15% by weight of bis(2-chloroethyl)vinylphosphonate.

10. A process for producing the non-woven fabrics of claim 1 comprising the steps of forming a layer of fibers, contacting the fibers in the layer with a polymer latex-base binding bath, compressing the layer to ensure that the polymer penetrates into the layer, and drying the layer, in which the polymer is an interpolymer comprising a copolymer A of butadiene, styrene and at least one ethylenic unsaturated carboxylic acid and a polymer B of bis(2-chloroethyl)vinylphosphonate which is at least partly grafted on to copolymer A.

* * * * *